United States Patent

Sasaki et al.

[11] 4,176,808
[45] Dec. 4, 1979

[54] PASSENGER RESTRAINING SEAT BELT RETRACTOR

[75] Inventors: Shiro Sasaki; Jun Yasumatsu, both of Toyota; Mitsuo Inukai, Nagoya, all of Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 818,302

[22] Filed: Jul. 25, 1977

[30] Foreign Application Priority Data

Aug. 6, 1976 [JP] Japan .................................. 51-105010

[51] Int. Cl.² ........................ A62B 35/00; B65H 75/48
[52] U.S. Cl. ........................... 242/107.1; 242/107.4 R; 280/807
[58] Field of Search ............................. 242/107–107.7; 280/744–747; 297/388

[56] References Cited

U.S. PATENT DOCUMENTS

| 2,814,504 | 11/1957 | Campbell et al. | 242/107.1 X |
| 3,465,983 | 9/1969 | Taggart | 242/107.11 |
| 3,549,203 | 12/1970 | Rawson | 242/107.1 X |
| 4,065,156 | 12/1977 | Tanaka et al. | 297/388 X |

Primary Examiner—Harvey C. Hornsby
Assistant Examiner—John M. Jillions
Attorney, Agent, or Firm—Koda and Androlia

[57] ABSTRACT

A seat belt retractor of the type for winding up two restraining seat belts on a single retractor shaft one over the other including a base, a retractor shaft rotatably supported by the base for winding up the two seat belts during retraction, a means for applying a retracting force to the retractor shaft and a means for applying a bending force to at least one of the two belts which is smaller in magnitude than the retracting force whereby slack is prevented from occurring in the retractor when the belts are wound out.

4 Claims, 6 Drawing Figures

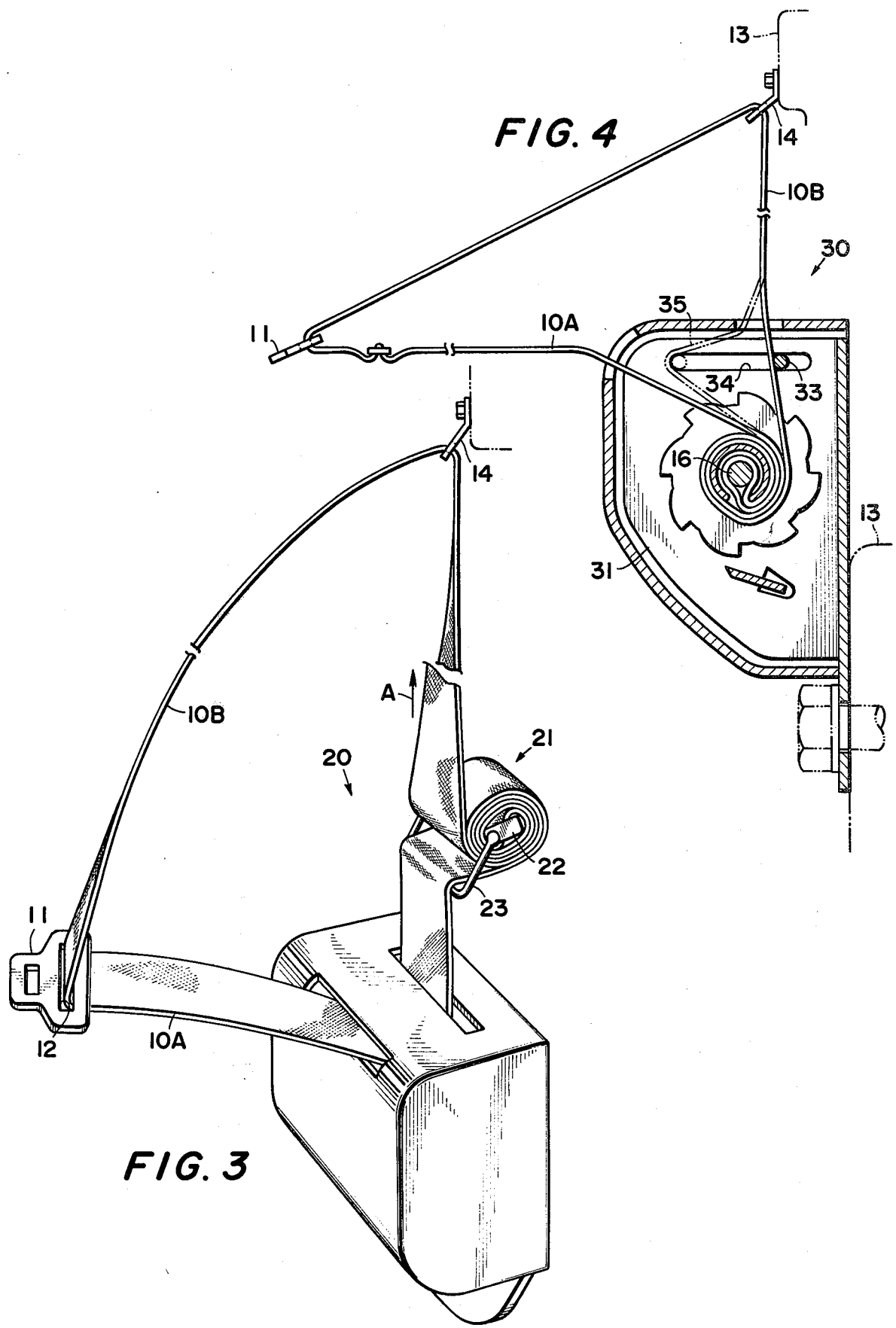

PASSENGER RESTRAINING SEAT BELT RETRACTOR

BACKGROUND OF THE INVENTION

1. Field of Invention

This invention relates to passenger restraining seat belt retractors and more particularly to restraining seat belt retractors which retract to restraining seat belts on a single retractor shaft one over the other.

2. Prior Art

Three point passenger restraining devices consisting of lap and shoulder restraining belts are widely used as restraining systems for the purpose of restraining passengers during vehicle emergencies, such as collisions, etc. In these three point restraining devices, the useability and storeability of the restraining belts are improved by the installation of a retractor system which retracts, by means of an applied force, the portions of the restraining belt not used by the passenger and the majority of the seat belt when the passenger is not using the restraining belts.

In such three point restraining devices, the installation of a separate restraining belt retractor for each of the lap and shoulder restraining belts is considered to be the most effective method of improving the useability and storeability of the belts. However, a restraining belt retractor system which retracts both restraining belts on a single shaft one over the other without injuring the useability or storeability of the belts has been proposed.

As shown in FIGS. 1 and 2, this two belts retractor type of restraining belt retractor system is designed as follows. The lap restraining belt 10A and the shoulder restraining belt 10B are formed by a single continuous belt which is folded back through an opening 12 in a tongue plate 11. The lap restraining belt 10A and the shoulder restraining belt 10B, which is folded back through an eye in an anchor 14 fastened to the upper portion of the side wall of the vehicle 13, are rolled up together on a single retractor 15 one over the other.

The retractor 15 is fastened to the lower portion of a side wall of a vehicle 13 and is designed so that the lap restraining belt 10A and the shoulder restraining belt 10B are rolled up on a powered retractor shaft 16 one over the other. The passenger sitting in the seat 17 puts the three point restraining device into use by engaging the tongue plate 11 with the buckle 18 which is anchored at the approximate center line of the vehicle 13.

Use of such a two belts retractor type of restraining belt retractor system makes it possible to simultaneously extend both restraining belts by pulling either one of the restraining belts from the retractor 15. Furthermore, since one continuous restraining belt is folded back through the tongue plate 11, it is possible to adjust the relative length of each belt so that the lap restraining belt 10A and the shoulder restraining belt 10B are both constantly maintained at an appropriate length for use. Accordingly, such a system has offered superior useability and handling in spite of the fact that only a single retractor is employed.

In this double retractor type of retractor system, however, when one of the restraining belts is grasped and pulled out, the tension acting upon the other restraining belt is weakened. Accordingly, there is the possibility that the other restraining belt will become slack inside the retractor mechanism (as indicated by the broken line in FIG. 2). A restraining belt which has become slack inside the retractor mechanism has a deleterious effect upon the handling characteristics and restraining ability of the system. In addition, the generation of such unnecessary slack may interfere with the operation of the inertial lock mechanism which automatically stops the extension of the restraining belts during a vehicle emergency.

Accordingly, the present invention has been designed with the aforementioned facts and difficulties in mind.

SUMMARY OF THE INVENTION

Accordingly, it is a general object of the present invention to provide a retractor mechanism for rolling up two seat belts which prevents the occurrence of slack inside the retractor mechanism.

It is yet another object of the present invention to provide a seat belt retractor for winding up two seat belts which is simple and easy to manufacture.

In keeping with the principles of the present invention, the objects are accomplished with an unique seat belt retractor of the type for retracting two seat belts on a single retractor shaft one over the other including a base, a retractor shaft rotatably supported by the base for winding up the two seat belts during retraction, a means for applying a retracting force to the retractor shaft and a means for applying a bending force to at least one of the two belts which is smaller in magnitude than the retracting force.

In operation, during the use of the restraining belts by the passenger, the belt portion of the restraining belt is caused to move toward the passenger before the portion of the restraining belt wound up on the retractor shaft is unwound from the retractor shaft. Accordingly, no slack will be generated in this restraining system while the passenger is extending the restraining belts and manipulating the tongue plate.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 3 is an oblique view showing a first embodiment of a passenger restraining belt in accordance with the teachings of the present invention;

FIG. 4 is a cross-sectional view of a second embodiment of a passenger restraining belt retractor in accordance with the teachings of the present invention;

DESCRIPTION OF THE INVENTION

Referring to FIG. 3, shown therein is a restraining belt retractor 20 in accordance with the teachings of the present invention. Similar to conventional models, this restraining belt retractor 20 winds up a lap restraining belt 10A and a shoulder restraining belt 10B on a retractor shaft one over the other (not shown). A universally known simple retractor mechanism 21 is provided at an intermediate point on the shoulder restraining belt 10B.

The simple retractor mechanism 21 consists of a reel frame 22, a bail and a spring installed within the reel frame 22. The force of the spring causes the reel frame 22 to rotate relative to the bail 23. This rotating action causes an intermediate portion of the shoulder restraining belt 10B to be wound up in two layers on the reel frame 22.

Figure 1:
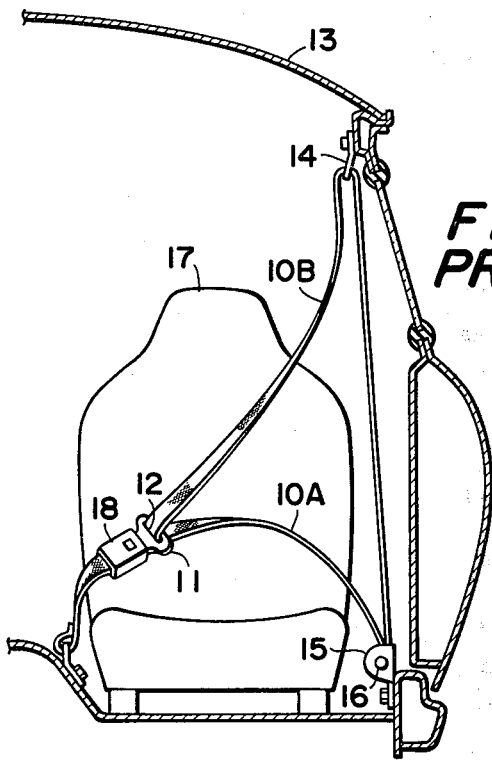
FIG. 1 is a partial cross-sectional view of a conventional prior art passenger restraining device.
Figure 2:
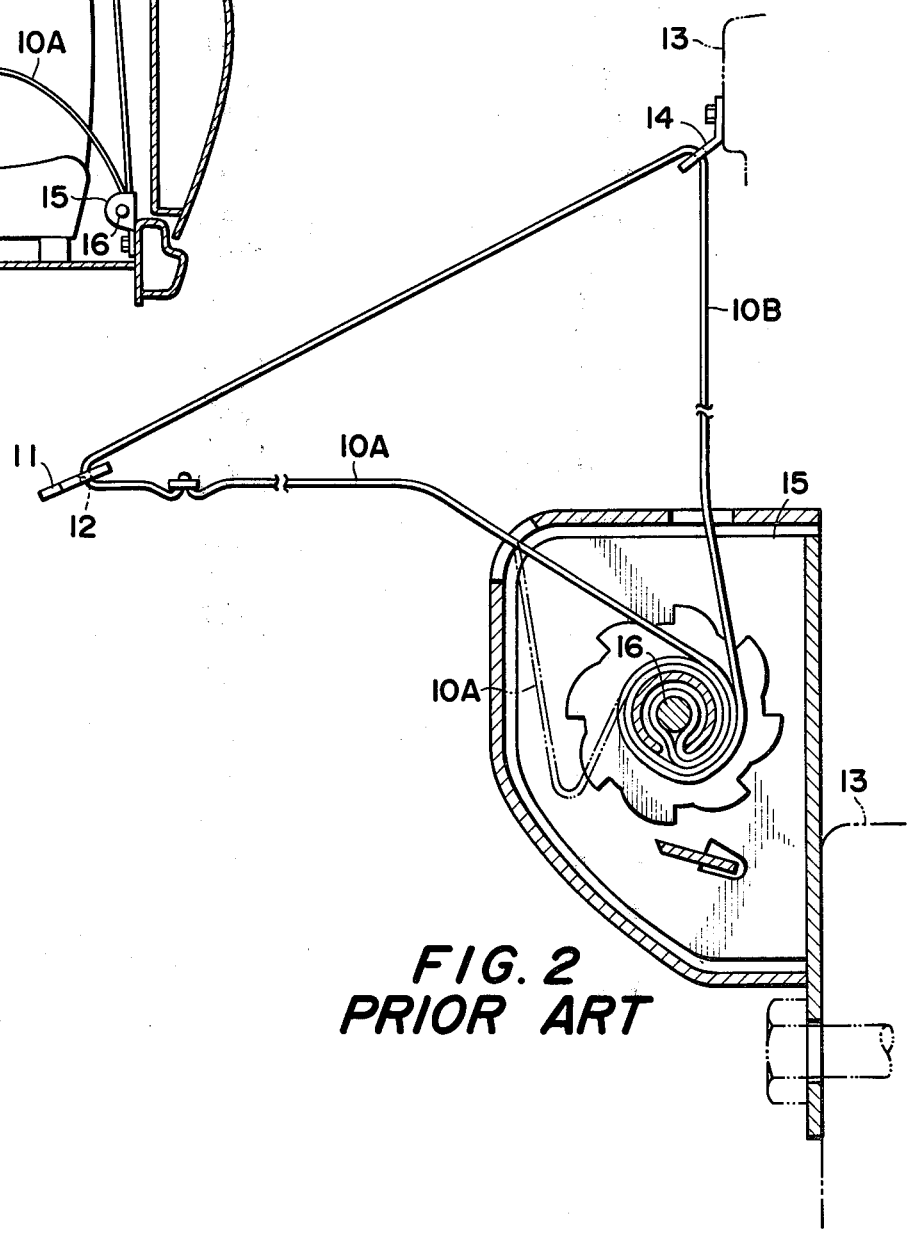
FIG. 2 is a cross-section of a conventional passenger restraining device illustrating a retractor mechanism.

The force of the spring inside the reel frame 22 is adjusted so that when the passenger applies a pulling force (in the direction indicated by arrow A) to this two belts wound shoulder restraining seat belt 10B in order to pull it into use, the portion of the shoulder restraining belt 10B wound up on the simple retractor mechanism 21 is unwound and moved toward the passenger before that portion of the shoulder restraining belt 10B rolled up inside the retractor mechanism 20 is unrolled. The form and construction of the remaining parts of the retractor 20 are similar to those in the conventional model shown in FIGS. 1 and 2. In operation, when the passenger pulls the shoulder restraining belt 10B in order to put the restraining belts into use, that portion of the shoulder restraining belt 10B wound up on the simple retractor mechanism 22 is unwound and moved toward the passenger before the remainder of the shoulder restraining belt is unwound from the retractor mechanism 20.

Since this amount of movement causes the shoulder restraining belt 10B to be moved an appropriate distance toward the passenger, the passenger is easily able to reach the tongue plate 11. He then grasps the tongue plate 11 and moves it in order to engage it with the buckle 18. The relative length of each belt is adjusted as both restraining belts are moved through opening 12 in tongue plate 11. Since the tension is equally applied to the lap restraining belt 10A and the shoulder restraining belt 10B, both restraining belts are extended exactly the same length from the retractor mechanism 20. Accordingly, no slack will be generated in the restraining belts inside the retractor mechanism 20.

Figure 5:
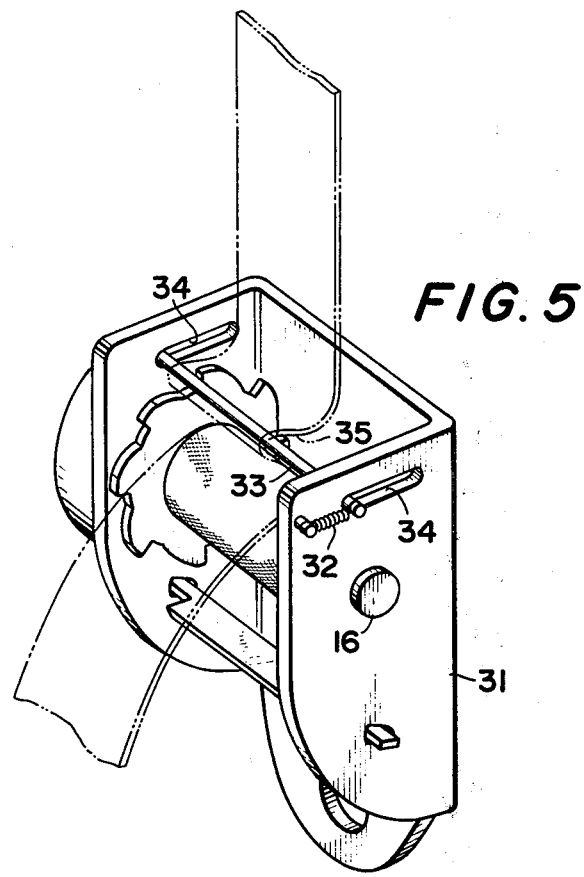
FIG. 5 is an oblique view of the embodiment of FIG. 4.

Referring to FIGS. 4 and 5, shown therein is a second embodiment of a retractor mechanism in accordance with the teachings of the present invention. Since the embodiment of FIGS. 4 and 5 is similar to the previous embodiment, like elements will be given like reference numerals and a description of their interconnection and operation will be omitted.

In FIGS. 4 and 5, a guide pin 33 powered by a spring 32 is provided in the base 31 which supports the restraining belt retractor shaft 16 in the passenger restraining belt retractor 30. The guide pin 33 is provided so that it is free to slide in slots 24 provided in the base 31. The guide pin 33 is held at one end (as indicated by the broken line in FIG. 4) of the slots 24 by means of spring 32 mounted between the guide pin 33 and the base 31. The portion of the shoulder restraining belt between the retractor shaft 16 and the anchor 14 is folded around this guide pin 33 to form a bent portion 35 of the belt.

The force of the spring 32 is adjusted so that when the passenger pulls the shoulder restraining belt 10B in the direction of belt extension from the retractor shaft 16 in the same manner as described above, the bent portion of the shoulder restraining belt 10B causes the guide pin 33 to slide along the slots 34 against the force of the spring 32 and move to a point near the opposite end of the slots 34 (see the solid line in FIG. 4). Accordingly, the bent portion 35 is straightened out so that the portion of the shoulder restraining belt 10B between the retractor shaft 16 and anchor 14 forms an approximate straight line. In operation in this second embodiment, when the passenger pulls the shoulder restraining belt 10B in order to put the restraining belts into use, the shoulder restraining belt 10B moves toward the passenger so that the passenger is able to grasp the tongue plate 11. As the passenger manipulates the belt after having grasped the tongue plate 11, the lap restraining belt 10A and the shoulder restraining belt 10B receive an equal amount of pulling force in the direction of belt extensions so that both belts are extended exactly the same amount from the retractor shaft 16. Accordingly, there is no danger of a slack forming in the lap restraining belt 10A inside the retractor mechanism 30.

Figure 6:
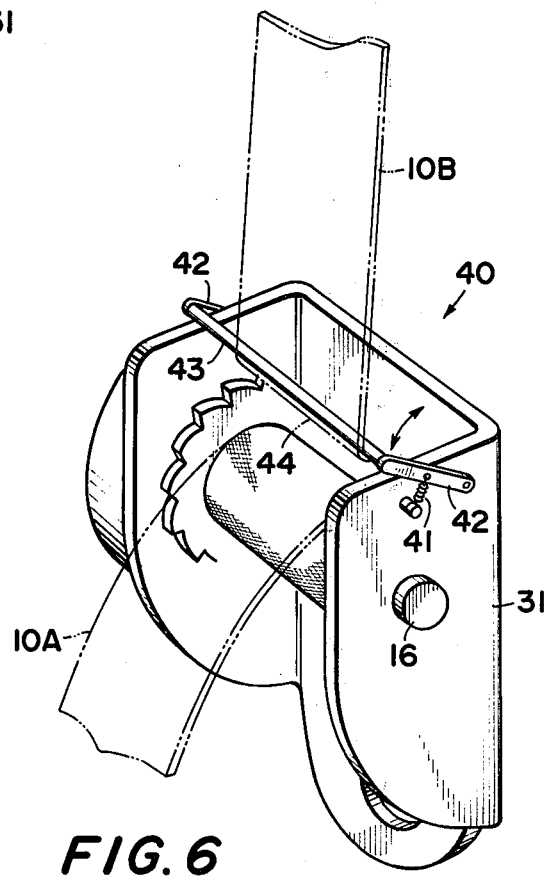
FIG. 6 is an oblique view illustrating a third embodiment of a passenger restraining belt retractor in accordance with the teachings of the present invention.

Referring to FIG. 6, shown therein is a third embodiment of a retractor mechanism in accordance with the teachings of the present invention. Since this third embodiment of FIG. 6 is similar to the embodiments previously shown, like elements in FIG. 6 are given like reference numerals and an explanation of their interconnection and operation is omitted.

In FIG. 6, a pair of swing arms 42 powered by a spring 41 is provided on the base 31 which supports the restraining belt retractor shaft 16 in the passenger restraining belt retractor 40. A guide pin 43 is provided between the tips of these swing arms 42. The force of the spring 41 causes the guide pin 43 to create a bent portion 44 in the shoulder restraining belt 10B between the retractor shaft 16 and the anchor 14.

Similar to that previously described, in operation the action of the bent portion 44 is as follows: when the passenger pulls the shoulder restraining belt 10B, the belt 10B is extended against the force of spring 41 so that this portion of the shoulder restraining belt 10B forms an approximate straight line. Therefore, the formation of slack in the lap restraining belt 10A inside the retractor mechanism 30 is avoided.

In each of the above described embodiments, the bent portion was described as being located at an intermediate point on the shoulder restraining belt 10B. It is clear, however, that this invention is not limited to such an arrangement. It would also be possible to locate this bent portion on the lap restraining belt or on both restraining belts. Furthermore, it is also clear that the means of creating this bent portion are not limited to simple retractor mechanisms or spring powered guide pin such as described above. Any device which creates an appropriate bent portion at an intermediate point on either of the restraining belts and in which this bent portion is straightened out as the restraining belts are put into use could be employed.

Furthermore, if the retracting force of the coil spring which powers the retracting shaft 16 during retraction is very strong, there is a possibility that the bent portion will become unobtainable. Accordingly, it is desirable to limit the amount of retraction force applied to the retractor shaft and set this amount of retraction force so that an appropriate bent portion will remain when retraction has been completed.

As has been described above, the passenger restraining belt retractor in accordance with the teachings of the present invention provides a bent portion in one or more of the restraining belts. Accordingly, it has superior effect of eliminating any danger of slack in the restraining belts inside the retractor mechanism even in cases where the two belts retracting type of restraining belt retractor systems is used.

In all cases it is understood that the above described embodiments are merely illustrative of a small number of the many possible specific embodiments which can represent applications of the principles of the present invention. Numerous and varied other arrangements can be readily devised in accordance with these principles by those skilled in the art without departing from the spirit and scope of the invention.

We claim:

1. A seat belt retractor for retracting two seat belts therein comprising:
    a base;
    two seat belts for restraining a passenger's shoulder and waist positions;
    a retractor shaft rotatably supported by said base thereon, and wherein said two seat belts are wound up one over the other;
    a means for applying a retracting force to said retractor shaft; and
    a means for applying a bending force to one of said two seat belts, said bending force being smaller in magnitude than said retracting force whereby slack is prevented from occurring at said one seat belt when said belts are wound out, said means for applying a bending force comprising a pair of opposing slots in said base, a guide pin extending through and slidable in said slots and engaging with one of said belts and a spring means provided between said guide pin and said base.

2. A seat belt retractor according to claim 1 wherein said belts are joined together to form a continuous belt.

3. A seat belt retractor for retracting two seat belts therein comprising:
    a base;
    two seat belts for restraining a passenger's shoulder and waist positions;
    a retractor shaft rotatably supported by said base thereon, and wherein said two seat belts are wound up one over the other;
    a means for applying a retracting force to said retractor shaft; and
    a means for applying a bending force to one of said two seat belts, said bending force being smaller in magnitude than said retracting force whereby slack is prevented from occurring at said one seat belt when said belts are wound out, said means for applying a bending force comprising a pair of swing arms rotatably coupled to said base, a guide pin extending between said swing arms and engaging with one of said belts and a spring means provided between said swing arms and said base.

4. A seat belt retractor according to claim 3 wherein said belts are joined together to form a continuous belt.

* * * * *